J. SHANDA.
ELASTIC WHEEL.
APPLICATION FILED MAR. 18, 1916.
1,258,477.
Patented Mar. 5, 1918.
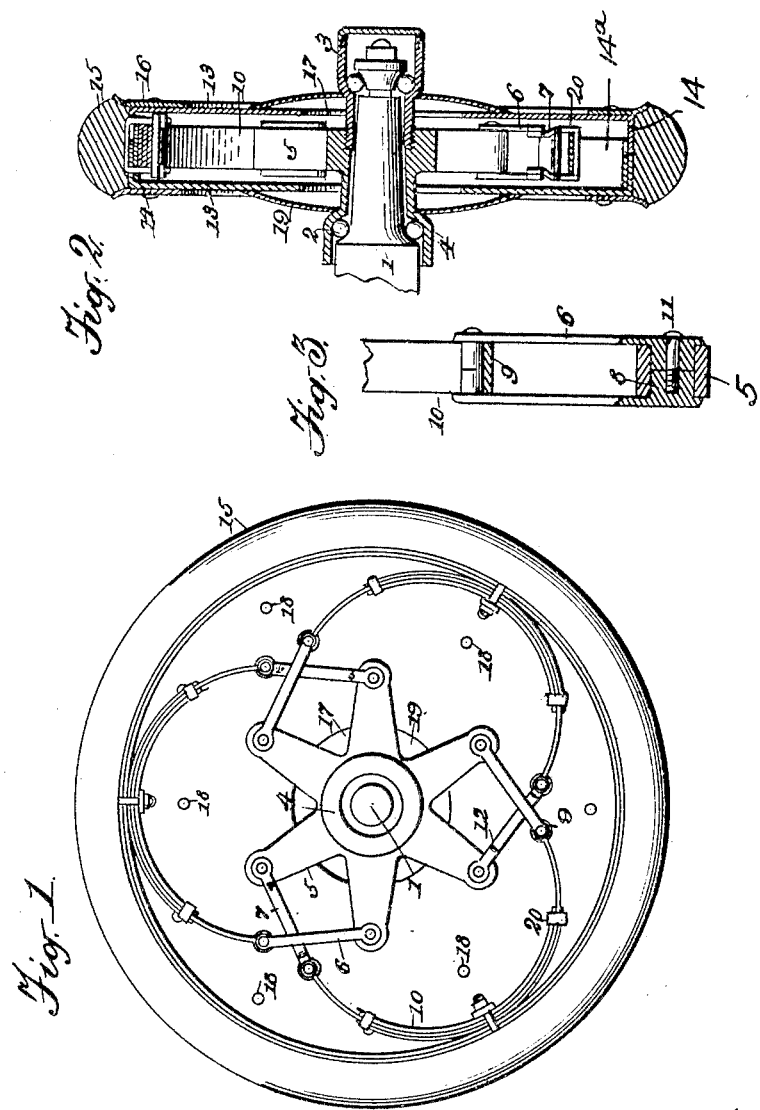

UNITED STATES PATENT OFFICE.

JOHN SHANDA, OF IRVING, IOWA.

ELASTIC WHEEL.

1,258,477.   Specification of Letters Patent.   Patented Mar. 5, 1918.

Application filed March 18, 1916.   Serial No. 85,070.

*To all whom it may concern:*

Be it known that I, JOHN SHANDA, a citizen of the United States, residing at Irving, in the county of Tama and State of Iowa, have invented certain new and useful Improvements in Elastic Wheels; and I do hereby declare the following to be a full, clear, and exact description of the invention, such as will enable others skilled in the art to which it appertains to make and use the same.

This invention relates to vehicle wheels, more especially those used on automobiles and motor trucks; and the object of the invention is to produce an elastic wheel, independently of the tire, whereby the desired resiliency may be obtained without depending entirely on the tire.

The invention consists in a novel construction of the wheel whereby the felly and tire are held in proper relation to the hub by suspending and supporting springs adapted to give universal limited movement, with suitable provision for the exclusion of mud and dust from the working parts.

In the accompanying drawing, forming a part of this specification, Figure 1 is a side elevation of a wheel embodying my invention, with one side removed to show the internal construction. Fig. 2 is a central cross-section of the same. Fig. 3 is an enlarged, partly sectional view of a pair of the spring hangers.

In the drawing, the numeral 1 denotes the axle of the vehicle, on the spindle of which is mounted the hub of the wheel by ball-bearings 2. In practice the hub is composed of two or more parts, 3 and 4, screwed together as shown. The former is in the nature of a spider 5, its arms serving as bearings for the spring hangers 6 and 7. These have bosses 8 journaled in the spider-arms and the eyes 9 of the springs 10, and are connected in pairs by suitable screws 11. As the hangers cross, one pair is offset at 12 so as to play inside the other pair. The springs are suitably clipped to the rim or felly of the wheel 13, which consists essentially of a pair of similar disks having right-angled annular flanges 14 abutting when in operative position, one of the flanges being provided with an internal ring 14ª adapted to telescope into the companion flange, as clearly shown at the bottom of Fig. 2. Central to each disk is a hole 17 large enough to allow for all necessary movement of the wheel hub in any direction. The main disks are suitably fastened together, as by bolts 18. Outside the main disks, and held in place by the hub, is a pair of concave covering disks 19 adapted to cover the holes in the main disks at all times, and to exclude mud and dust from the interior.

The springs are semi-circular in form, and designed for both suspension and compression. The attachment of the ends of the springs is also such as to counteract, flexibly, the torsion of the hub, as is necessary when the wheel is used as a driver. The action of the springs is thus practically universal and secures substantial uniformity of tension in all its working directions, and whenever a jolting stress is applied to any point on the periphery of the wheel.

It will be noted that the hangers are attached to the middle leaves of the springs, the outer leaves being held in proper operative position by stirrups 20 slidable slightly on the middle leaves.

The construction is such as to give convenient access to the interior of the wheel, for inspection or repairs, and to facilitate the attachment of new tires and the removal of old ones. The interior of the wheel may be inspected without even jacking up the wheel, by merely unscrewing the outer half of the hub, which holds the dust-excluding disk in place, and unbolting the two halves of the wheel. The outer half may then be removed, without disturbing the half attached to the axle. To remove the tire it is of course necessary to jack up the wheel.

Having thus described my invention, I claim:

1. An elastic wheel, comprising a pair of disks having inturned, annular flanges of equal diameter, one disk having an internal ring projecting laterally beyond its flange, and adapted to telescope inside the flange of the companion disk, suspending springs attached to the disk having said internal ring, and a hub-spider with arms linked to the ends of said springs.

2. An elastic wheel, comprising a pair of disks with large central holes and abutting annular flange, one of said disks having an attached internal ring projecting laterally beyond the flange, and adapted to telescope inside the flange of the companion disk, suspension springs attached to the disk having said ring, a hub-spider whose arms are linked to the ends of the springs, dust-excluding disks adapted to close the large central holes of the disks, and an outer, bearing portion of the hub screwed into the main portion, and having an outer enlargement engaging the dust-excluding disk.

In testimony whereof I affix my signature in presence of two witnesses.

JOHN SHANDA.

Witnesses:
FRANK ROBERTS,
C. W. HANSMAN.

Copies of this patent may be obtained for five cents each, by addressing the "Commissioner of Patents, Washington, D. C."